Jan. 14, 1930.  J. J. McKEON  1,743,788
APPARATUS FOR TREATING FLOTANT MATERIAL
Original Filed Feb. 27, 1926   3 Sheets-Sheet 3
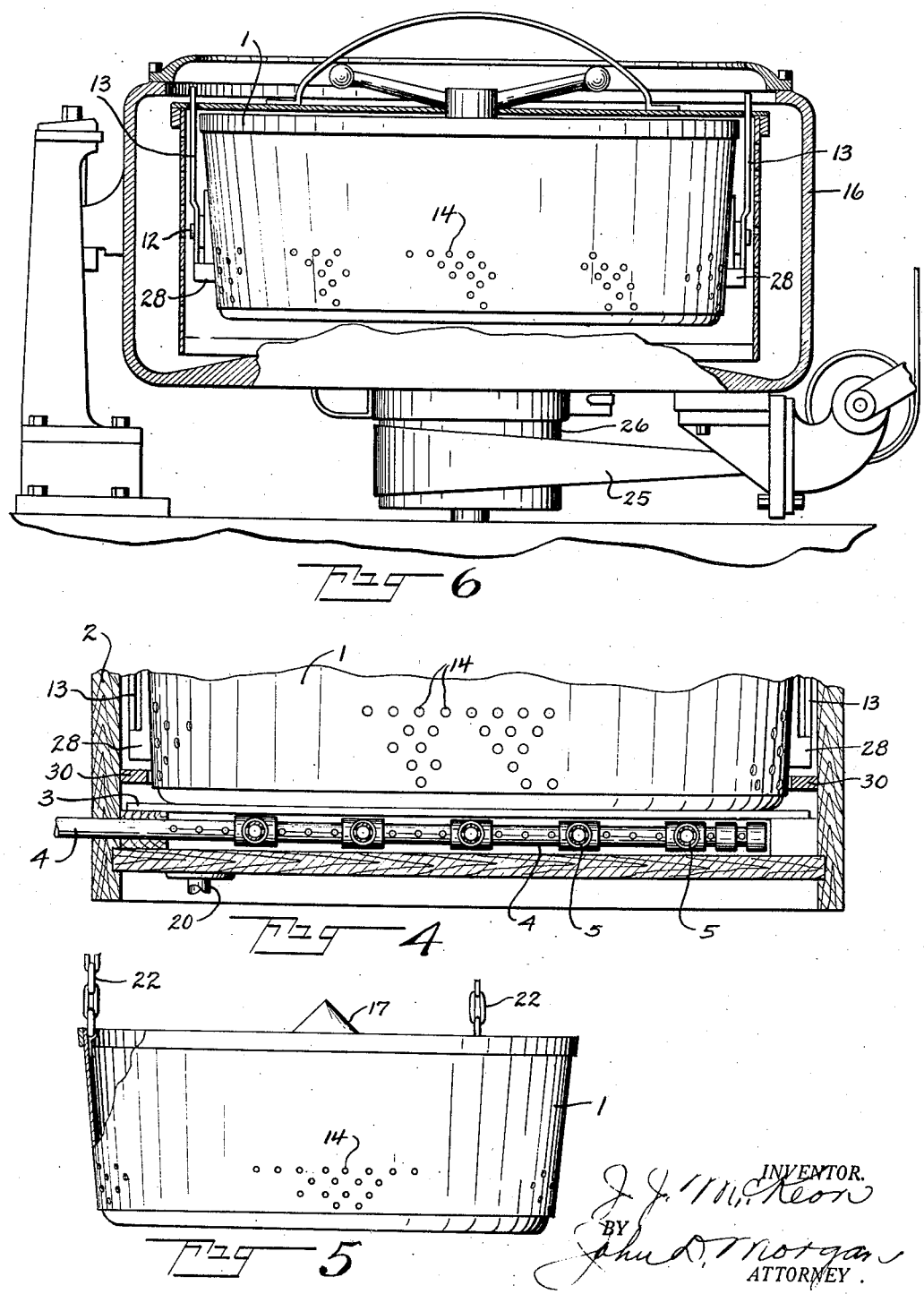

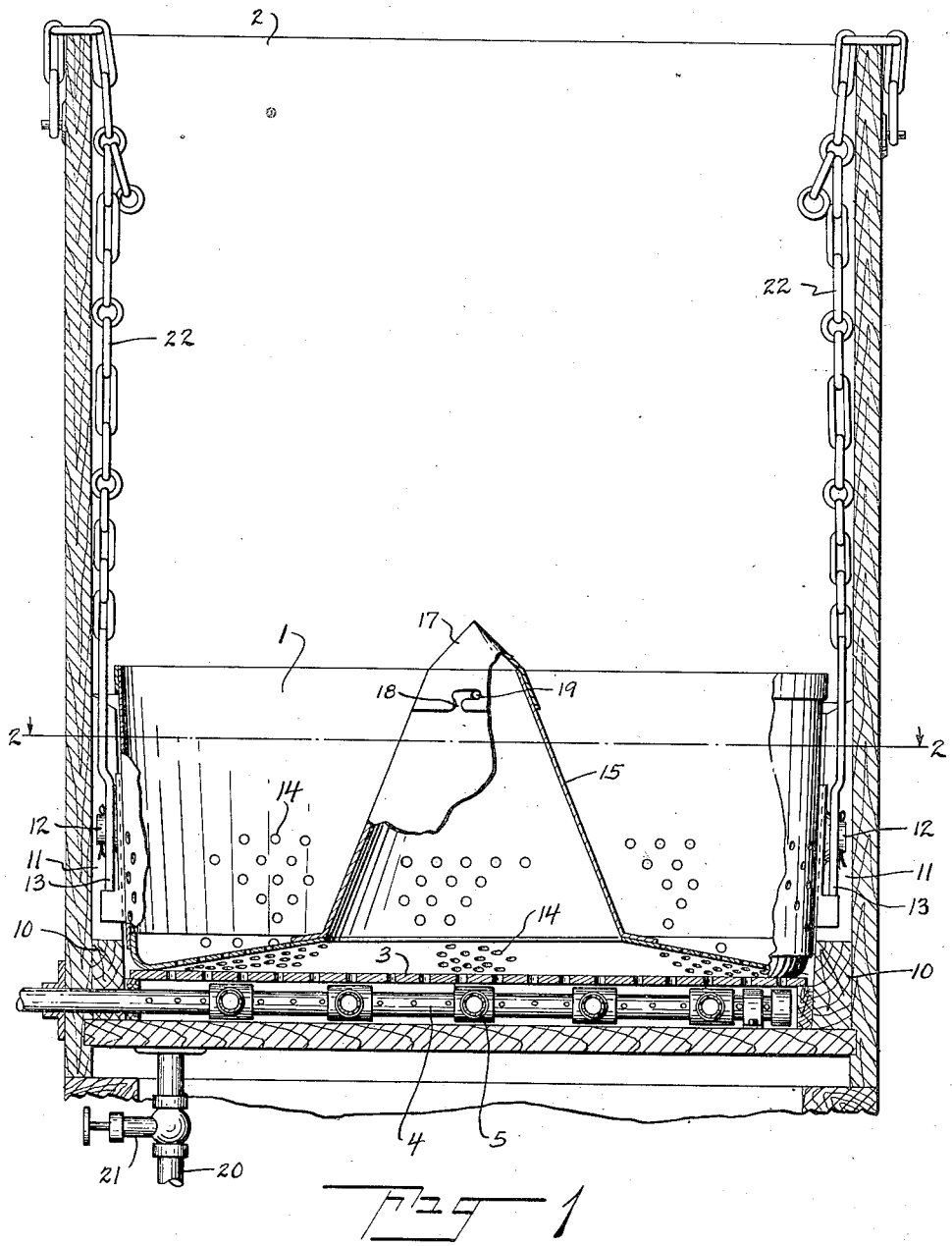

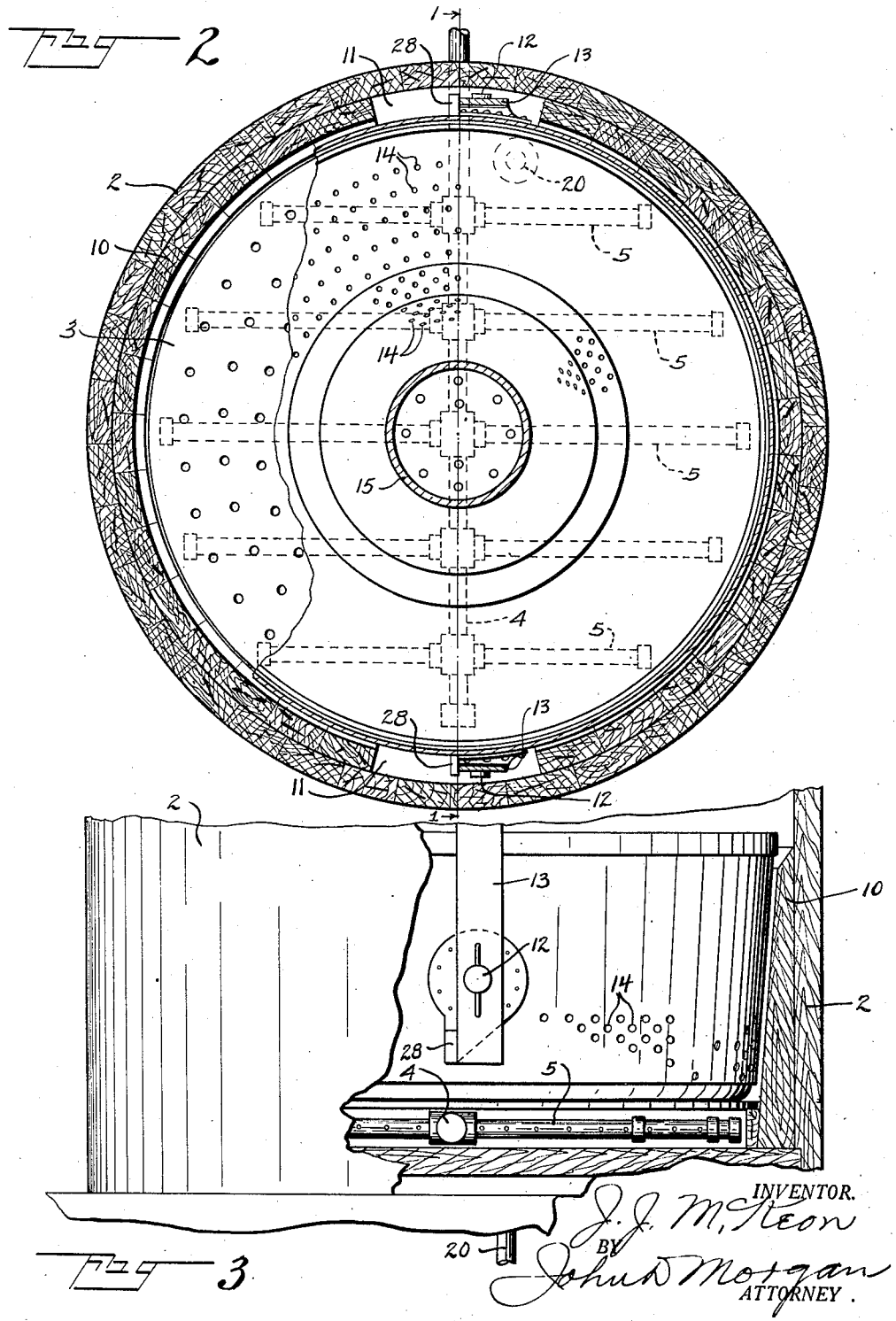

Patented Jan. 14, 1930

1,743,788

UNITED STATES PATENT OFFICE

JOHN J. McKEON, OF TROY, NEW YORK, ASSIGNOR, BY MESNE ASSIGNMENTS, TO TOLHURST MACHINE WORKS, INC., OF TROY, NEW YORK, A CORPORATION OF NEW YORK

APPARATUS FOR TREATING FLOTANT MATERIAL

Original application filed February 27, 1926, Serial No. 91,096. Divided and this application filed June 4, 1927. Serial No. 196,585.

The invention relates to a novel apparatus for treating flotant material.

The invention also relates to a novel apparatus for degumming silk.

This application is a division of my copending application Ser. No. 91,096, filed February 27, 1926.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and sub-combinations, and improvements herein shown and described.

The accompanying drawings, referred to herein and constituting a part hereof, illustrate one embodiment of the invention, and together with the description, serve to explain the principles of the invention.

Of the drawings:—

Fig. 1 is a vertical section, on line 1—1 of Fig. 2, showing one form of vat, and one form of a centrifugal basket which I may employ, Fig. 2 is a horizontal section, substantially on the line 2—2 of Fig. 1, looking down in the direction of the arrows;

Fig. 3 is a fragmentary side elevation of the vat, partly broken away;

Fig. 4 is a fragmentary vertical section through the vat, showing a different form of baffle plate;

Fig. 5 is a side elevation, partly broken away, of the centrifugal separator basket;

Fig. 6 is a vertical section through an ordinary form of centrifugal separator, showing the basket adapted to cooperate with such mechanism.

I will describe my invention more particularly with relation to degumming silk, though it is to be understood that my invention may be employed in treating any flotant material.

It is now the common practice in silk mills to degum silk by pulling out and cutting off one pound of silk from a bale of silk, putting that separated portion of silk into a net bag, tying the bag, and putting a plurality of these bags, usually about a hundred of them, into a vat, where they are cooked in a dissolving liquor heated by steam coils. The length of cook varies, but is usually about an hour, or an hour and a half. The operators, at the expiration of the cook, then hook out these different net bags, containing the silk, until they have the required number to fill a centrifugal separator. The centrifugal separators employed usually have a capacity of about one hundred pounds of silk. After hooking out all the net bags from the first cook containing the cooked silk—in the case given one hundred—they are loaded on a truck and moved over to another part of the factory, where each bag is individually placed in the basket of a centrifugal separator. They are then subjected to centrifugal force in the separator to expel the liquor of the first cook. After this has been done they are severally again loaded on the truck and taken back to the same, or a similar vat, where they are again, for the second time, cooked in a fresh dissolving liquor, the first liquor having been withdrawn after the removal of the bags. The silk in the net bags is again cooked, in the second liquor, for approximately an hour, or an hour and a half. The bags are again, for the second time, hooked out of the vat, placed on a truck, and taken over to the separator, where they are again, for the second time, subjected to centrifugal action to drive out the liquor of the second cook. They are then individually taken out of the separator by the operators; the bags are untied, the silk removed therefrom, and fed to the ordinary dryer for the finished drying.

By my improved apparatus I greatly simplify the treatment of the silk and materially reduce the cost of degumming it.

In my invention I employ a centrifugal basket 1 which can be dropped into the vat 2 and permitted to rest upon the bottom plate 3 of the vat. The vat 2 is then substantially filled with the ordinary dissolving liquor which is heated by steam passing through the steam pipes 4 and 5.

Instead of cutting substantially a pound of silk from the bale, bagging and tying it, the operator simply takes a mass or hunk of silk from the bale, say a hundred pounds, and throws it, unbagged, into the vat 2, where it is loose and flotant in the cooking liquor. It will be cooked for the ordinary period, usually about an hour, or an hour and a half.

The silk is ordinarily in the form of waste so that no steps have to be taken to avoid tangling. It is to be understood, however, that my invention is not to be confined to treating silk waste for any flotant material may be processed.

In cooking the silk I have found that it is very desirable to insure an even circulation of the liquor through the mass of the flotant silk. To prevent circulation between the interior of the vat 2, and the exterior of the centrifugal basket 1, I may mount in the vat any suitable form of baffle, as for example, a ring of wood or other material 10, cut away at 11, 11 so that the trunnions 12, 12 and the rods 13, 13 may pass into the baffle 10 and permit the basket to become seated upon the plate 3.

I have also found in practice that the centrifugal basket 1 should, preferably, not be provided with apertures or holes throughout its periphery, but on the contrary these holes 14, 14 should be in the bottom of the basket and in the sides for only a portion of their height. Of course, the exact height of these holes or perforations 14, 14 on the sides of the basket 1 may vary, as found convenient or expedient to obtain the best results. I have obtained excellent results with the centrifugal basket 1 perforated as shown in Fig. 1, these perforations serving to distribute the bubbles, due to boiling, throughout the flotant silk, where the bubbles seem to have a mechanical action on the gum contained in the silk.

The particular form of centrifugal basket 1 may vary. In the drawings I have shown one form having a conical seat 15 which is adapted to cooperate with the proper member of a centrifugal separator, as for example, 16 (Fig. 6). To prevent circulation of the liquor through the conical seat 15 I close one end of the seat by a conical cap 17, the cap being provided with any suitable locking means to cooperate with the basket; as for example, the bayonet slots 18, 18 cooperating with the pins 19, 19 only one pin and slot being shown. This cap 17 effectively closes the small end of the conical seat 15 and prevents the passage of the liquor and the bubbles formed in the cooking.

After the silk, or other flotant material, has been cooked the required period the liquor in the vat 2 is withdrawn through the drain pipe 20 controlled by the valve 21. As the liquor passes out through the drain 20, the flotant silk falls by gravity, with the liquor, and is caught within the centrifugal basket 1. As soon as all the liquor has been withdrawn, the centrifugal basket 1, now filled with the mass of cooked unbagged silk, is lifted out of the vat 2 in any suitable manner, such as by the chains 22, 22, and taken bodily over to the centrifugal separator 16, the cap 17 being removed so that the basket can cooperate with the centrifugal separator (Fig. 6). The basket is then rotated through the belt 25, pulley 26 and vertical spindle (not shown) until substantially all the liquor absorbed by the silk has been extracted in the centrifugal separator 16.

The centrifugal basket 1 is then removed from the centrifugal separator 16 and taken again to the same vat 2, or a similar one, without handling or disturbing the mass of the substantially dry silk which it contains. The conical cap 17 is then again placed on the conical seat 15 and the centrifugal basket is lowered into the vat 2, as shown in Fig. 1. The valve 21 in the drain 20 is then closed, and new dissolving liquor is supplied to the vat 2 to permit the silk to be again cooked, for the second time. After the second cook, the valve 21 is operated to open the drain 20 to permit the second cooking liquor to be withdrawn, so that the flotant silk will again, for the second time, fall into the centrifugal basket 1, as the second cooking liquor is withdrawn from the vat 2. The basket 1 is then, for the second time, removed from the vat 2, taken to the centrifugal 16, where the mass or bulk of silk in the basket 1 is again, for the second time, dried. After treatment in the centrifugal 16 the basket is removed from the centrifugal and the mass of silk in the basket is dumped on a table or on the floor by rocking the basket 1 on its trunnions 12 so as to move the stops 28 from the arms 11. The comparatively dry silk is then fed to the ordinary dryer in the usual manner, where the final drying takes place.

Instead of using the baffle 10, I may use any other suitable form of baffle, such as a metal ring 30 (Fig. 4).

In a silk mill having twenty-four vats and several extractors handling 10,000 pounds of silk per day, it requires about twelve (12) men pulling and bagging and five (5) men boiling and extracting. By my invention the same quantity of silk can be degummed by two men pulling and three men boiling and extracting.

I also avoid entirely the expense of net bags, and the cost of their repair and replacements due to wear, and particularly the excessive wear due to hooking the bags out of the vats.

It will be clear that my apparatus may be employed where it is desired simply to collect flotant material in a receptacle by subsidence of any liquid in which it may have been washed, or otherwise treated, and whether or not it is subsequently treated.

Also it is clear that my apparatus may be employed to collect the flotant material in a receptacle, by drawing off the liquid, as above, and then removing the receptacle and further processing the material in the same receptacle, or in another receptacle.

The invention in its broader aspects is not limited to the specific mechanisms shown and described but departures may be made therefrom within the scope of the accompanying claims without departing from the principles of the invention and without sacrificing its chief advantages.

What I claim is:—

1. In an apparatus for treating flotant material the combination of a vat to cook the material in a dissolving liquor, a centrifugal basket provided with a conical seat and adapted to be submerged in the vat and provided with holes in its bottom and for a portion only of its periphery to direct the circulation of the cooking liquor, and means to close one end of the conical seat of the basket.

2. In an apparatus for treating flotant material the combination of a vat to cook the material in a dissolving liquor, a centrifugal basket provided with a conical seat and a cap to close one end of the seat, said basket being adapted to be submerged in the vat and provided with holes in its bottom and for a portion only of its periphery to direct the circulation of the cooking liquor.

3. In an apparatus for treating flotant material the combination of a vat to cook the material in a dissolving liquor, a centrifugal basket provided with a seat to fit a driving member of a centrifugal separator, said basket being adapted to rest within the bottom of the vat, and a removable cap to close one end of the seat in the basket.

4. An apparatus for treating loose flotant materials including in combination a vat for cooking the flotant materials in a liquor bath, a perforate basket of a centrifugal drying machine seated in the bottom of the vat, means in the vat for heating the liquor, and means for constraining the convection currents and bubbles in the heated liquor to flow directly upwardly through the basket and the flotant materials thereabove.

5. An apparatus for treating loose flotant materials including in combination a vat for cooking the flotant materials in a liquor bath, a perforate basket of a centrifugal drying machine seated in the bottom of the vat, means in the vat for heating the liquor, and means for preventing local circulation of the heated liquor between the basket and the adjacent portion of the vat.

6. An apparatus for treating loose flotant materials including in combination a vat for cooking the flotant materials in a liquor bath, a perforate basket of a centrifugal drying machine seated in the bottom of the vat, means in the vat for heating the liquor, and means for preventing local circulation of the heated liquor between the basket and the adjacent portion of the vat including means for closing the perforations in the sides of the basket.

7. An apparatus for treating loose flotant materials including in combination a vat for cooking the flotant materials in a liquor bath, a perforate basket of a centrifugal drying machine seated in the bottom of the vat, means in the vat for heating the liquor, and means for preventing local circulation of the heated liquor between the basket and the adjacent portion of the vat including a baffle between the lateral periphery of the basket and the inner walls of the vat.

8. An apparatus for treating loose flotant materials including in combination a vat for cooking the flotant materials in a liquor bath, a basket of a centrifugal drying machine seated in the bottom of the vat, said basket having a seat adapted to fit the driving member of a centrifugal separator, means for heating the liquor in the vat, and means for preventing local circulation of the heated liquor between the basket and the lower portion of the vat, including removable means for closing one end of the seat.

9. An apparatus for treating loose flotant materials including in combination a vat for cooking the flotant materials in a liquor bath, a perforate basket of a centrifugal drying machine removably seated in the bottom of the vat, means in the vat for heating the liquor, and means for constraining the convection currents and bubbles in the heated liquor to flow directly upwardly through the basket and the flotant materials thereabove including a baffle between the exterior of the basket and the interior of the vat.

In testimony whereof, I have signed my name to this specification.

JOHN J. McKEON